United States Patent [19]

Miers et al.

[11] 4,122,908
[45] Oct. 31, 1978

[54] FAN NOISE SUPPRESSOR AND BAFFLE

[75] Inventors: Bruce W. Miers; Frederick D. Proksch, both of Peoria; Gerald H. Welker, Eureka, all of Ill.

[73] Assignee: Caterpillar Tractor Co., Peoria, Ill.

[21] Appl. No.: 832,253

[22] Filed: Sep. 12, 1977

[51] Int. Cl.$^2$ ............................................. B60K 11/04
[52] U.S. Cl. .................................. 180/68 P; 181/211
[58] Field of Search ................ 180/54 A, 69 R, 68 P; 181/207, 210, 211; 123/198 E

[56] References Cited

U.S. PATENT DOCUMENTS

| | | | |
|---|---|---|---|
| 1,723,813 | 8/1929 | Schneider | 180/69 R |
| 3,812,927 | 5/1974 | Kawamura | 180/54 A |
| 3,857,453 | 12/1974 | Buttke et al. | 180/54 A |
| 3,982,600 | 9/1976 | Gerresheim et al. | 180/54 A X |

Primary Examiner—Joseph F. Peters, Jr.
Assistant Examiner—Milton L. Smith
Attorney, Agent, or Firm—Wegner, Stellman, McCord, Wiles & Wood

[57] ABSTRACT

A power unit including a liquid-cooled engine, a radiator in fluid communication with the engine for cooling engine coolant, a fan on one side of the radiator for directing air therethrough, and a noise suppressing baffle on the other side of the radiator for altering the path of travel of air exiting the radiator and absorbing fan noise including a housing containing, noise suppressing material. The housing includes the improvement wherein a perforated panel faces the side of the radiator opposite the fan and is slightly spaced therefrom with the panel being pyramid-shaped and extending toward the radiator and presenting at least three generally planar surfaces intersecting at a common point to the radiator.

5 Claims, 3 Drawing Figures

U.S. Patent  Oct. 31, 1978  4,122,908
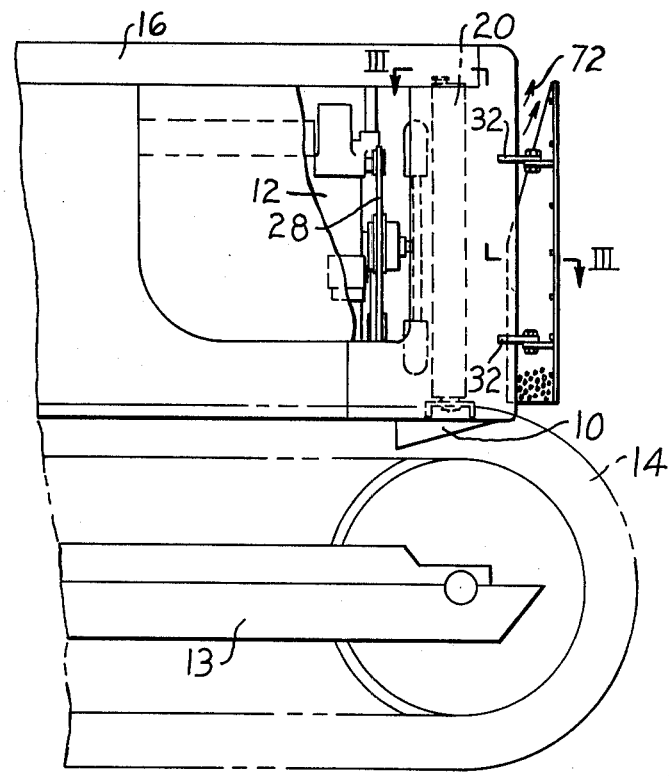
Fig-1-
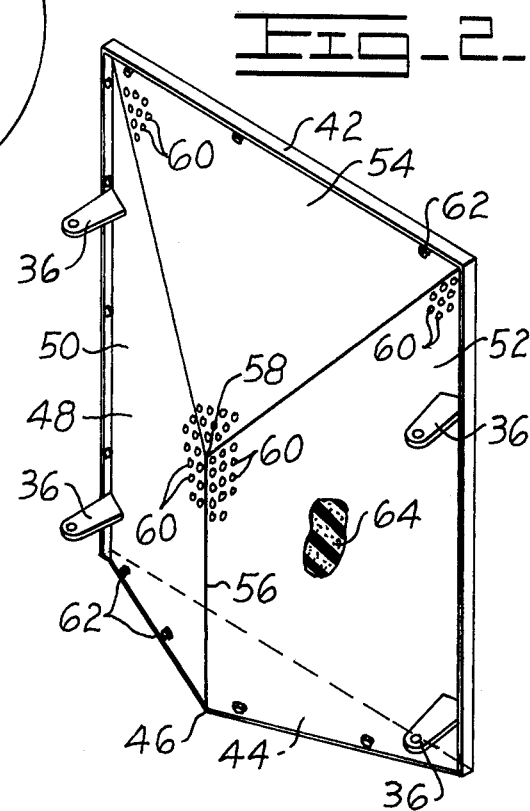
Fig-2-
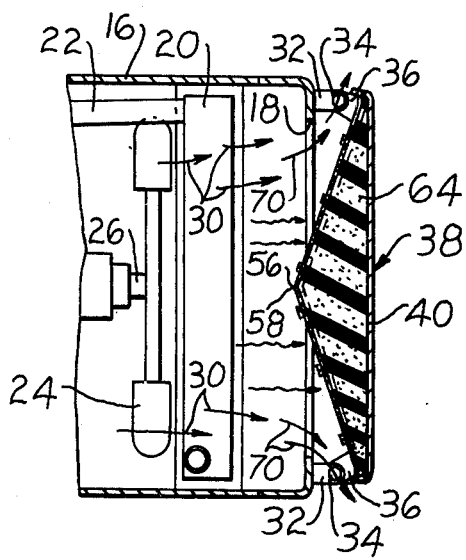
Fig-3-

4,122,908

FAN NOISE SUPPRESSOR AND BAFFLE

BACKGROUND OF THE INVENTION

This invention relates to noise suppressing apparatus and, more specifically, a combination noise suppressor and baffle for suppressing fan noise generated in the cooling system of power units including liquid-cooled engines.

Prior art of possible relevance includes the following U.S. Pat. Nos. 3,812,927 issued May. 28, 1974 to Kawamura; and 3,857,453 issued Dec. 31, 1974 to Buttke et al.

A considerable percentage of the noise generated during the operation of a power unit including a liquid-cooled, internal combustion engine, is generated by the fan typically employed to drive air through a radiator for the engine coolant. With present day concern for the lowering of noise levels attendant the operation of any type of machinery, there has been increasing focus on minimizing the noise generated by fans utilized in the cooling system of power units including a liquid-cooled engine. In many cases, fan designs have been made more efficient so as to either minimize the size of the fan required to produce a given air flow or minimize its operating speed, thereby decreasing the amount of noise generated by reason of the resulting ability to utilize a smaller or slower fan. In taking such an approach, a point is reached whereat only marginal improvement can be attained since as long as a fan is required, there will be noise attendant to its operation.

In other cases, in systems where air is forced through a radiator by a fan, it has been suggested to place a noise absorber in the path of the air exiting the fan. Care must be taken, however, to ensure that the noise absorber does not impede the flow of air through the radiator by creating a backpressure, for such would reduce the cooling capability of the system; and if too severely reduced, would require the use of a larger or higher speed fan with the resulting consequence of an increase in the noise level due to the use of a larger fan or higher speed. Also, the more conventional absorbers are subject to damage during vehicle operation.

SUMMARY OF THE INVENTION

The present invention is directed to overcoming one or more of the above problems.

According to the present invention, there is provided an improved noise suppressing baffle for use in power units including a liquid-cooled engine and a radiator in communication with the engine for cooling the engine coolant. The improved baffle includes a housing containing noise suppressing means. The housing is in part defined by a perforated panel facing the radiator side oppositely from the fan and which is slightly spaced therefrom. The panel has an apex which extends towards the radiator and is defined by three surfaces intersecting at a common point, with the surfaces facing the radiator.

In a highly preferred embodiment, and where the power unit is a vehicle, the surfaces are disposed so as to deflect the air emanating from the radiator laterally, to both sides thereof, and upwardly of the radiator but not downwardly thereof.

Other objects and advantages will become apparent from the following specification taken in connection with the accompanying drawings.

DESCRIPTION OF THE DRAWINGS

FIG. 1 is a fragmentary, side elevation of a power unit, specifically, a vehicle such as a tractor, embodying the invention;

FIG. 2 is a perspective view of a noise suppressing baffle made according to the invention; and FIG. 3 is a sectional view taken approximately along the line 3—3 in FIG. 1.

DESCRIPTION OF THE PREFERRED EMBODIMENT

An exemplary embodiment of a noise suppressing baffle made according to the invention is illustrated in FIG. 1 in association with a power unit in the form of a vehicle. However, it is to be understood that the invention can be employed with efficacy in stationary power units of the type having liquid-cooled engines and radiators.

The power unit includes a vehicle frame 10 on which an internal combustion, liquid-cooled engine 12 is mounted. The frame 10 is flanked by track frames 13 (only one of which is shown) which mount ground engaging crawler type tracks 14 whereby the vehicle may traverse the underlying terrain. A suitable housing 16 is mounted on the frame 10 and encompasses the engine 12 and, as seen in FIG. 3, includes a forwardly directed opening 18.

Rearwardly of the opening 18 and forwardly of the engine 12 is a radiator 20 of conventional construction which is connected as by hoses 22 or the like to the cooling system of the engine 12.

Interposed between the engine 12 and the radiator 20 is a multi-bladed fan 24 mounted on a shaft 26 which is suitably journalled and driven by the engine 12 via belts 28 such that the fan 24 forces air through the radiator 20 towards the opening 18, as indicated by arrows 30.

The housing 16, on opposite sides of the opening 18, mounts plural, forwardly projecting tongues 32 which mount, by means of bolts 34, rearwardly directed tongues 36 secured to a noise suppressing baffle, generally designated 38. The baffle 38 is in the form of a housing, the forwardmost side 40 of which is defined by a rectangular, relatively heavy gauge metal plate having a peripheral, rearwardly directed flange 42. As best seen in FIG. 2, the lower side 44 of the flange 42 is peaked at 46.

The housing is completed by a panel 48 which faces the radiator 20 and is slightly spaced therefrom, as seen in FIGS. 1 and 3. The panel 48 is preferably formed of a single sheet of material, such as metal, to have three surfaces 50, 52 and 54. The surfaces 50 and 52 intersect along a line 56 and the surface 54 intersects the surfaces 50 and 52 at a point 58. The line 56 and point 58 define an apex which is directed towards the radiator 20.

All of the surfaces 50, 52 and 54 are perforated as at 60 over their entire extent and the panel 48 is secured to the panel 40 at their common periphery by sheet metal screws 62 or the like. In the usual case, the tongues 36 will be welded to the panel 48 and, specifically, in spaced relation along the periphery thereof on the surfaces 50 and 52, as best seen in FIG. 2.

The interior of the housing defined by the panels 40 and 48 is filled with a noise absorbing material 64 of any suitable type. By reason of the fact that the surfaces 50, 52 and 54 all face the radiator 20 and are perforated, sound generated by the fan 24 and engine will tend to impinge upon the panel 48 and enter the perforations 60 to be absorbed by the material 64. Conversely, the air passing through the radiator 20 will be deflected to the side, as indicated by arrows 70 (FIG. 3) and upwardly, as indicated by arrows 72 (FIG. 1) through the space between the forward end of the housing 16 and the panel 48 by reason of the separation between the two provided by the interconnected tongues 32 and 36.

Because of the pyramid shape of the panel 48, air is deflected through about 270° of arc with the baffle 38 made according to the invention. Consequently, the noise level is reduced from that of the prior art systems which tend to concentrate the noise in a limited air exhaust pattern. Moreover, the large arc of deflection and forward spacing of the barrier can be sized to ensure that there will be no backpressure of air at the radiator 20 which would minimize cooling system efficiency while utilizing a minimum of fore and aft space.

While not shown herein, it is contemplated that a surface similar to the surface 54 could be added to the underside of the baffle 38, particularly if the baffle is to be employed in a stationary power unit. However, in a vehicle such as is illustrated, it is preferred that no such additional surface be provided for the reason that downward deflection of an air stream, particularly in rough, dusty terrains, could cause dust to be kicked up to interfere with the vision of the operator of the vehicle.

Finally, it will be appreciated that a baffle made according to the present invention is inexpensive to manufacture and resistant to damage and nonetheless provides a uniform air emission pattern which eliminates a high concentration of air flow, and thus noise, in any one direction.

The embodiments of the invention in which an exclusive property or privilege is claimed are defined as follows:

1. In a power unit including a liquid-cooled engine, a radiator in fluid communication with said engine for cooling engine coolant, a fan on one side of said radiator for directing air therethrough, and a noise suppressing baffle on the other side of said radiator for altering the path of travel of air exiting said radiator and absorbing fan noise including a housing containing noise suppressing means, the improvement wherein said housing includes a perforated panel facing said radiator other side and slightly spaced therefrom, said panel being pyramid-shaped and extending toward said radiator and presenting at least three generally planar surfaces intersecting at a common point to said radiator.

2. The power unit of claim 1 wherein said engine is mounted on a vehicle frame having ground engaging and traversing means and wherein there are a total of three said surfaces, said housing being mounted on said frame such that air will be deflected laterally to both sides of said radiator and upwardly of said radiator but not downwardly thereof.

3. In a power unit including a liquid-cooled engine, a radiator in fluid communication with said engine for cooling engine coolant, a fan on one side of said radiator for directing air therethrough, and a noise suppressing baffle on the other side of said radiator for altering the path of travel of air exiting said radiator and absorbing fan noise including a housing containing noise suppressing means, the improvement wherein said housing includes a perforated panel facing said radiator other side and slightly spaced therefrom, said panel having an apex extending toward said radiator and being defined by two surfaces intersecting at a line and a third surface intersecting said two surfaces, said surfaces facing said radiator.

4. The power unit of claim 3 wherein said panel has a rectangular periphery and is formed of a single sheet of material; and further including a plurality of tongues secured to said panel at spaced locations about said periphery and directed toward said radiator, and mounting means associated with said power unit engaging said tongues and mounting said housing on said radiator other side.

5. The power unit of claim 3 wherein said engine is mounted on a vehicle frame having ground engaging and traversing means and wherein there are a total of three of said surfaces, said surfaces further being generally planar, said housing being mounted on said frame with said line generally vertically disposed and said third surface uppermost so that air will be deflected laterally to both sides of said radiator and upwardly of said radiator but not downwardly thereof.

* * * * *